United States Patent Office 3,294,726
Patented Dec. 27, 1966

3,294,726
COMPOSITION FOR PROTECTING AND
CLEANING SURFACES
Jay S. Wyner, 141—30 Pershing Crescent,
Jamaica, N.Y. 11435
No Drawing. Filed Sept. 7, 1962, Ser. No. 222,188
3 Claims. (Cl. 260—29.6)

This invention relates to a coating composition suitable for use on relatively smooth metallic and non-metallic surfaces.

Generally speaking, coating or polishing compositions heretofore compounded have utilized organic oils and waxes as the glossing agent. Wax coatings are commonly applied to the surfaces of furniture, automobiles, wood, asphalt tile, linoleum floors, and the like, in order to impart a pleasing, lustrous appearance and a protective film against dirt and moisture. Suspensions of such waxes as carnauba, beeswax and paraffin have been used for this purpose and have been applied in such forms as aqueous dispersions and solvent-containing pastes. Although such materials produce good surface appearance, they suffer from certain inherent disadvantages. Polishes formed of oil and soft waxes are easily applied to the surfaces but tend to smear and show fingerprints. Coatings or polishes based on hard waxes are not easy to apply and generally require more effort to polish to a high luster. Furthermore, such coatings do not have adequate resistance to weathering conditions.

Since the purpose of a coating is to protect the underlying surface by filling all crevices and pores therein, it is important that the film-forming constituent of the polish spread smoothly and uniformly over the whole surface and require minimum rubbing to bring out the desired luster.

I have now discovered a coating composition capable of being spread substantially uniformly over a surface and capable of imparting a high degree of luster thereto. My novel composition is preferably, though not necessarily, wax free and forms a hard protective coating characterized by high resistance to weathering, whether applied to metal or non-metal surfaces.

It is an object of my invention to provide an improved coating composition which may be applied to a variety of metal and non-metal surfaces with a minimum of effort.

Other objects are to provide an improved coating composition which does not smear, which has good adhesion and covering characteristics on various type surfaces, which exhibits improved resistance to weathering, which has good scrub resistance, and which when applied to a surface simultaneously cleans the surface as the coating film is being formed.

Stating it broadly, my novel coating composition comprises a water emulsion of an acrylic polymer, at least one of the substances selected from the group consisting of white mineral oil and glycerine, a finely divided inorganic abrasive material, and an emulsifying agent, the aqueous composition having a creamy-like consistency. The essential constituents making up my novel composition may range by weight from about 1 to 25% of an acrylic and/or methacrylic ester resin, about 3 to 30% by weight of at least one substance selected from the group consisting of white mineral oil and glycerine, preferably 3 to 20% white mineral oil and 3 to 15% glycerine, about 2 to 40% of a finely divided (e.g. minus 325 mesh) inorganic abrasive material, such as a siliceous material comprising a mixture of bentonite and diatomaceous earth, about 0.1 to 5% of an emulsifying agent, for example an alkyl phenoxy polyethoxy ethanol such as that referred to in the trade as Triton X45, and the balance essentially water in an amount falling in the range of about 40% to 85%. I prefer in producing my coating composition to utilize an acrylic ester film-former which is a blend of several formulations. Thus, the acrylic polymer which preferably comprises 1 to 25% of the total composition may be formulated from an aqueous acrylic polymer emulsion of the type referred to in the trade as Rhoplex AC–33 (which is described in Canadian Patent No. 572,548 as a water-insoluble copolymer containing about 40% methyl methacrylate, about 60% ethyl acrylate and about 1% of an acrylic acid), an acid-containing crosslinked acrylic emulsion copolymer of the type referred to in the trade as Acrysol ASE–60, and an acrylic copolymer of an acrylic ester and a methacrylic ester formed by mixing monomeric esters together in the desired proportions before they are polymerized. Examples of the latter are copolymers referred to in the trade as Acryloid B–72 resins (which is described in U.S. Patent No. 2,910,376 as an acrylate-methacrylate copolymer). Examples of polyacrylic esters are those of the primary aliphatic alcohols containing up to 12 carbon atoms, preferably the lower groups comprising methyl and ethyl acrylates as the acrylates of the higher aliphatic groups tend to be soft. Rhoplex AC–33 is further described in a brochure bearing the designation AP–22–57 (revised October 1959) published by Rohm and Haas as an acrylic resin emulsion having a solids content of about 46%, a pH of 9.0 to 9.5, a white milky liquid appearance, a weight per gallon of 8.5 to 8.8 lbs. and a specific gravity of solids of 1.15.

Acrysol ASE–60 is described in a brochure bearing the designation AP–11–56 (revised May 1960) published by Rohm and Haas as a thickener comprising an acid-containing, crosslinked acrylic emulsion copolymer. When the emulsion is diluted with water and neutralized with a base, each emulsion particle swells greatly. It has a solids content of about 28%, a pH of about 3.5, a viscosity of about 4.0 cps., a specific gravity of 1.054 at 25° C., milky in appearance and is anionic.

Acryloid B–72 and B–44 are described in a brochure bearing the designation C–46–58 (September, 1960 edition) published by Rohm and Haas as a polymer of esters of acrylic and methacrylic acids. Acryloid B–72 is a solution using toluene as a solvent which contains about 40% solids, has a specific gravity of about 0.97, and a viscosity in centipoises of about 480 to 640 at 30° C. Acryloid B–44 is very similar but has a viscosity in centipoises of about 600 to 1100.

Examples of methacrylic esters are also those of the primary aliphatic alcohols mentioned above. Of these, the esters of the lower groups are preferred, e.g. methyl and ethyl methacrylate. Polymerized methyl methacrylate is the more preferred ester. It forms a colorless transparent film. This ester is also known in the trade as "Lucite," "Plexiglas," "Crystallite," etc.

An example of a copolymer of an acrylic ester and a methacrylic ester is one comprising methyl acrylate and methyl methacrylate. While I prefer to use Acryloid B–72, I may also use Acryloid B–44.

The acrylic esters employed in the composition may comprise about 0.1 to 4% of an aqueous acrylic polymer of methyl acrylate (Rhoplex) based on the solids content, about 0.05 to 4% of the acid-containing crosslinked acrylic emulsion copolymer (Acrysol) based on the solids content, and about 1 to 12% of the acrylic copolymer comprising a polymerized mixture of an acrylic ester and a methacrylic ester (e.g. methyl acrylate and methyl methacrylate), the total amount of the acrylics ranging preferably from about 1.5 to 15% of the composition. In preparing the acrylics for my formulation, I prefer to use an aqueous emulsion of Rhoplex AC–33 containing about 46% solids, an aqueous emulsion of Acrysol ASE–

60 containing about 28% solids and Acryloid B–72 comprising 40% of the acrylic copolymer dissolved in toluol.

In working over any of the foregoing composition ranges, I prefer to use, though not necessarily, a coupling agent to insure a substantially homogeneous dispersion of the materials making up the formulation. An example of such a coupling agent is ethylene glycol monoethyl ether sold under the trade mark "Cellosolve." Broadly, the coupling agent may comprise any compound in an amount ranging from 0.2 to 4% having the formula $HOCH_2CH_2OR$ in which R is a saturated aliphatic radical containing 1 to 7 carbon atoms. With or without the foregoing coupling agents, I may employ 0.5 to 4% ethylene glycol.

In carrying out the broad aspects of my invention, I use white mineral oil because of its plasticizing effect on the film-forming materials. The glycerine acts like mineral oil but in addition helps to lubricate and clean the surface and also to retard the hardening of the film formers sufficiently during application, thereby to insure the production of a thin uniform surface film and absorption of the film-forming material into crevices, porous areas, etc. The finely divided inorganic material aids as an abrasive to clean the surface of any adhering dirt and to expose a freshly cleaned surface to the film formers. The emulsifying agent helps to maintain the ingredients as a homogeneous creamy mixture and retard separation within the container, thereby insuring a long shelf life of the emulsion.

In forming an aqueous dispersion of the essential ingredients making up my composition, I prefer to add small amounts of other ingredients, such as hardeners for the coating, dispersing agents, cleaning agents, phase stabilizers, etc. For example, with the acrylics I might employ small amounts of a styrene, latex acrylic or nitro cellulose acetate solution or polyvinyl chloride.

Examples of other preferred compositions of the coating material particularly useful are given as follows:

| Constituents | Preferred Range, Percent | Narrow Range, Percent | Nominal Composition, Percent |
| --- | --- | --- | --- |
| Aqueous Acrylic Polymer Emulsion | 0.1–4 | 0.1–2 | 0.2 |
| Acid Containing Cross linked Acrylic Emulsion Copolymer | 0.05–4 }* | 0.05–2 | 0.1 |
| Copolymer of Acrylic Ester and Methacrylic Ester | 1–12 | 2–6 | 3.0 |
| Polystyrene Latex | 0.05–3 | 0.05–1 | 0.15 |
| White Mineral Oil | 3–20 | 5–15 | 8.5 |
| Glycerine | 3–15 | 5–12 | 10.0 |
| Bentonite | 0.5–10 | 0.5–3 | 0.9 |
| Alkyl Phenoxy Polyethoxy Ethanol | 0.2–4 | 0.4–1 | 0.5 |
| Diatomaceous Earth | 1.5–20 | 2–8 | 3.5 |
| Borax | 0.5–4 | 1–2 | 1.5 |
| Formaldehyde | 0.2–4 | 0.5–2 | 0.7 |
| Amyl Acetate | 0.2–3 | 0–5.1 | 0.7 |
| Gum Tragacanth | 0.2–3 | 0.5–2 | 0.7 |
| Ethylene Glycol Monoethyl Ether | 0.2–4 | 0.3–1 | 0.5 |
| Ethylene Glycol | 0.5–4 | 0.5–2 | 1.0 |
| Triethanolamine | 0.2–4 | 0.4–1 | 0.6 |
| Water (essentially balance) | 45–80 | 55–75 | 60–70 |

*Preferred total ranging from 1.5 to 15%.

I find that the additional ingredients I employ in the more preferred, the narrow, and the nominal compositions insure obtaining a coating having optimum properties. The addition of polystyrene latex of the type referred to in the trade as Lytron 600 imparts hardening characteristics to the film-forming acrylic polymers. The borax helps to soften the water and thus insure relatively stable mixtures. The formaldehyde functions as a surface cleaner and as a disinfectant. Amyl acetate tends to promote a cleaning action and better surface wetting. The addition of gum tragacanth is advantageous in maintaining a uniform dispersion of the ingredients throughout the aqueous mixture and in minimizing segregation thereof and thus adds further to the shelf life of the composition. The emulsifying agent (e.g., the non-ionic alkyl phenoxy polyethoxy ethanol) is a surfactant having wetting and detergent properties as well and, as stated hereinbefore, helps to form compatible water and oil mixtures and provide a smooth cream-like solution after complete mixing.

The Cellosolve solvent, besides acting as a coupling agent, has a beneficial effect in improving the drying characteristics of the film. The ethylene glycol contributes towards maintaining homogeneity of the mixture while triethanolamine aids in removing surface deposits on metal surface, such as rust, during application of the coating.

In producing 48 gallons of mixture, the following method is employed:

Thirty two gallons of water in a mixing container is heated to 180° F. and 6 lbs. of borax added to soften it. Thereafter, the following ingredients are added in the order stated while the mix is agitated by means of a propeller-type stirrer at a speed which may range from 800 to 1800 rpm. The amounts of materials added are as follows: one quart of triethanolamine; one and a half pints of Rhoplex AC–33 containing 46% solids; one and a half pints of Acrysol ASE–60 containing 28% solids; one and a half pints of Lytron 600 containing 40% soilds; one third gallon of formaldehyde; one and a half quarts of amyl acetate; 3 lbs. of gum tragacanth; 5 gallons of white mineral oil; one quart of Triton X45; 4 lbs. of bentonite; 15 lbs. of diatomaceous earth; 3 gallons of Acryloid B–72 containing 40% solids; one quart of cellosolve solvent; one and a half quarts of ethylene glycol; 4 gallons of glycerine; and 3 oz. of lemon oil scent or perfume.

The stirring is continued until a mixture having a uniform creamy-like consistency is obtained capable of maintaining a uniform dispersion for long periods of time. I find that the coating provided by the foregoing composition can be applied to a surface by wiping with little effort by means of an absorbent cloth.

The utilization of an electronic ultra-high frequency device for producing a stable creamy smooth mixture may be used in conjunction with the foregoing mechanical stirring in order to insure a more highly uniform and creamy-like consistency for the mixture.

During the wiping operation, the finely divided abrasive material helps to loosen any adherent dirt on the surface while other ingredients in the mixture help to carry it away for absorption by the cloth. Because a clean surface is being produced during the wiping action, the film-forming material is enabled to attach itself to the clean surface as a thin film during wiping and also fill in any crevices or pores and seal them against the weathering elements prevailing in the ambient environment. Only the film-forming material remains on the surface being treated, the other ingredients of the composition being substantially selectively absorbed by the cloth during wiping while any solvents which may remain on the surface evaporate to leave the film forming material.

The deposited coating hardens after the completion of wiping and forms a clear protective finish, without detracting from the original color of the treated surface.

Examples of metal and non-metallic surfaces which may be treated by my novel coating composition are given as follows: such metals as aluminum, anodized aluminum, brass, bronze, chrome plate, copper, stainless steel and galvanized iron; such wood surfaces as mahogany, cherry, fruitwood, walnut and oak; surfaces having paint finishes such as baked enamels, lacquers, acrylics and glass enamels; glass surfaces whether clear, smoked, glazed and the like; linoleums including inlaid linoleum, sandran-vinyl, asphalt, rubber tile, etc; plastic surfaces including styrene; polyethylene, phenolics, vinyl, Plexiglas, Lucite, nylon, Bakelite, formica, etc.; smooth inorganic surfaces such as marble, porcelain, ceramics, and the like; and such other materials as leather and similar materials.

It is to be understood that my composition is not limited for use on new surfaces only but, on the contrary, is highly effective for use on surfaces which may have acquired an oxidized film or other coating that is removable by my composition.

It will be appreciated that various cleaning and coating compositions may be formulated in accordance with the use intended. For example, in formulating the preferred mix starting with 32 gallons of water mentioned hereinabove, I may add, in addition to the other stated ingredients of the aforementioned preferred mix, three-quarter gallon of Acryloid B-44 to produce a formulation for use on formica, marble tile, plastics, porcelain and the like.

For fine wood furniture and paneling, I may add to the preferred mix an additional one-quarter gallon of amyl acetate, an additional one gallon of Acryloid B-72, one-quarter gallon toluol and one gallon of Acryloid B-44.

For aluminum surfaces, I may add the following to the preferred mix: one-half gallon of Acryloid B-44, one-quarter gallon of toluol, three-quarter gallon of phosphoric acid, two quarts of ammonia, one pint of detergent, one quart of Tergitol, one quart of oleic acid, an additional 20 lbs. of diatomaceous earth and 5 lbs. of bentonite.

For use on autos and accessories, I may add an additional one-quarter gallon of amyl acetate, an additional three-quarter gallon of Acryloid B-72, one-quarter gallon of toluol and three-quarter gallon Acryloid B-44.

In treating the surface of such metals as copper, brass, and bronze, I may add the following to the preferred mix: an additional 8 lbs. of diatomaceous earth, one quart of monoisopropylamine, one-half quart of oleic acid and three-quarter gallon of Acryloid B-44.

For stainless steel and chrome, I may add to the preferred mix: 8 lbs. additional of diatomaceous earth, one-half quart of mono-isopropylamine, one-half quart of oleic acid and one and one-quarter gallons of Acryloid B-44.

As will be apparent from the above, the formulation may be varied to suit specific needs, although the results of the invention in general can be achieved by working within just the broad range. An example of one composition falling within the broad range which has given good results on various material surfaces comprises by weight about 6.0% of a copolymer of an acrylic ester and methacrylic ester (e.g. a copolymer of methyl acrylate and methyl methacrylate), 9.25% white mineral oil, 6% glycerine, 0.6% bentonite, 3% diatomaceous earth, 0.6% of an emulsified (e.g. Triton X45) and the balance essentially water.

*Evaluation tests*

Evaluation tests conducted on coatings produced from the novel composition indicated the coating to have properties superior to paste wax and emulsion type cleaner polish containing silicones. Tests employed included (1) resistance to weather, (2) resistance to temperature variation, (3) resistance to salt spray, (4) resistance to water and chemicals, and as a coating on metal surfaces (5) a mechanical test to evaluate resistance to cutting, drilling and bending.

With regard to resistance to weather, an accelerated test is used equivalent to 16 to 18 months (about 275 to 300 hours of actual testing) of actual use. In this test, the specimens are placed in a container and subjected to simulated weather fluctuations comparable to the four seasons, heat, cold, rain, dry spells, sunlight, etc.

The resistance to temperature variation was obtained by subjecting the specimens to a cycling test varying from −20° F. to 165° F.

The resistance to salt was evaluated by subjecting test panels to a 10% salt spray for 60 hours.

The resistance to water and chemical solutions comprised immersing the test panels in water, mild acid and alkali for 48 hours.

The mechanical test involved subjecting metal test panels to cutting, drilling and bending through a 180° bend over a ⅛" dowel to note evidence of chipping, peeling or cracking.

A test conducted with painted steel panels coated with an emulsion type wax containing silicone and a conventional type paste wax for automobiles showed these waxes to be inferior to the composition of the invention. In the weather resistant test, the emulsion type wax broke down after an equivalent of 6 months of testing and the paste wax after 8 months' equivalent. The wax coating became dull in the temperature variation test. In the salt test, both wax coatings showed a considerable amount of dulling.

When the painted steel panels were coated with the novel coating material, the resistance to weather was equivalent to 16 to 18 months. The temperature variation test showed no deterioration in the plastic coating and no reduction in gloss; and marked resistance to salt spray was indicated as evidenced by no deterioration and no dulling of the plastic coating.

Similar results were obtained with tests conducted on chrome plated steel and stainless steel; on aluminum and anodized aluminum; and on brass, bronze and copper surfaces. With respect to resistance to water and chemical solution, the test panels showed no evidence of any damage to the coating or the metallic surface after 48 hours. Also, there was no evidence of chipping, peeling or cracking of the coating during the mechanical test. Coated aluminum test panels subjected to concentrated exhaust and chemical fumes emanating from a combustion engine for 200 hours showed no evidence of deterioration of the plastic coating.

It becomes apparent from the foregoing that the novel coating composition provides an improved coating capable of imparting long range protection to surfaces under the most adverse environmental conditions while at the same time provide a glossy surface. Because the invention provides a superior long-lasting coating, maintenance, labor and operating costs may be kept at a minimum, particularly when the coating is applied to surfaces which are exposed to weather conditions or otherwise adversely affected by other sources.

It will be appreciated that while certain specific ingredients are given with respect to the preferred compositions, other equivalent materials may be employed in their place. For example, in place of polystyrene latex, I may employ a synthetic interpolymer latex known in the trade as Lytron 680 which is referred to as a modified acrylic latex in a Data Sheet dated February 1962 by Monsanto Chemical Company. I prefer in producing my coating composition to utilize an acrylic or methacrylic which can be mixed with a styrene, or styrene latex acrylic, or nitrocellulose acetate, or polyvinyl chloride, which blends can be used conveniently for different surfaces, whether metallic or non-metallic, depending on the type of protection needed and the exposure and end use of the surface.

Of course, any one of various perfumes or scents may also be added to the coating composition but these are not essential.

Although the present invention has been described in conjunction with preferred embodiments, it is to be understood that modifications and variations may be resorted to without departing from the spirit and scope of the invention, as those skilled in the art will readily understand, and such modifications and variations are considered to be within the purview and scope of the invention and the appended claims.

What is claimed is:

1. A wiping composition for applying a coating to metal and non-metal surfaces by wiping said composition onto said surfaces with an absorbent cloth, said composition consisting essentially of about 1 to 25% by weight of a polyacrylic ester selected from the group consisting of ethyl acrylate, methyl acrylate, ethyl methacrylate, methyl methacrylate and copolymers thereof, about 3 to 30% of at least one substance selected from the group consisting of white mineral oil and glycerine, about 2 to 40% of a finely divided water insoluble inorganic abrasive material, about 0.1 to 5% of an emulsifying agent, about 0.2 to 4% of a coupling agent having the formula $HOCH_2CH_2OR$ in which R is a saturated radical containing 1 to 7 carbon atoms, and water in the range of 45 to 85%, whereby when said composition is applied to a surface with an absorbent cloth, only the film-forming ingredient remains on the surface being treated, the other ingredients of the composition being substantially selectively absorbed by the cloth during wiping and also removed through evaporation.

2. The wiping composition of claim 1 wherein the abrasive constitutes about 0.5 to 10% bentonite and about 1.5 to 20% diatomaceous earth, wherein the emulsifying agent is comprised of about 0.2 to 4% alkyl phenoxy polyethoxy ethanol, and wherein the composition also contains about 0.2 to 4% ethylene glycol monoethyl ether, about 0.5 to 4% borax, about 0.05 to 3% polystyrene latex, about 0.2 to 3% amyl acetate, about 0.2 to 3% gum tragacanth, about 0.5 to 4% ethylene glycol, and about 0.2 to 4% triethanolamine.

3. In the application of a protective coating to metal and non-metal surfaces, the improvement which comprises providing a composition consisting essentially of about 1 to 25% by weight of a polyacrylic ester selected from the group consisting of ethyl acrylate, methyl acrylate, ethyl methacrylate, methyl methacrylate and copolymers thereof, about 3 to 30% of at least one substance selected from the group consisting of white mineral oil and glycerine, about 2 to 40% of a finely divided water insoluble inorganic abrasive material, about 0.1 to 5% of an emulsifying agent, about 0.2 to 4% of a coupling agent having the formula $HOCH_2CH_2OR$ in which R is a saturated radical containing 1 to 7 carbon atoms, and water in the range of 45 to 85%, and then wiping said composition on a surface using an absorbent cloth whereby to apply the film-forming ingredient on the surface, while the remaining ingredients including the solids are selectively absorbed by the cloth during wiping and also removed through evaporation.

References Cited by the Examiner

UNITED STATES PATENTS

| | | | |
|---|---|---|---|
| 2,189,854 | 2/1940 | Brown et al. | 260—29.6 |
| 2,204,520 | 6/1940 | Walker | 260—29.6 |
| 2,387,967 | 10/1945 | Zimmerman | 260—29.6 |
| 2,721,145 | 10/1955 | Cheronis | 260—29.6 |
| 2,787,603 | 4/1957 | Sanders | 260—80.5 |
| 2,795,564 | 6/1957 | Conn | 260—29.6 |
| 2,827,441 | 3/1958 | Romatowski | 260—29.4 |
| 2,829,067 | 4/1958 | Eastland | 260—29.6 |
| 2,868,749 | 1/1959 | Frazier | 260—29.6 |
| 3,023,177 | 2/1962 | Boucher | 260—29.6 |

FOREIGN PATENTS 572,548    3/1959    Canada.

OTHER REFERENCES

Doolittle: Technology of Solvents and Plasticizers, Wiley and Sons Publishing, 1954 (p. 655 sec. beginning Glycerol).

MURRAY TILLMAN, *Primary Examiner.*

WILLIAM H. SHORT, *Examiner.*

N. F. OBLON, *Assistant Examiner.*